Re. 24377

July 24, 1956 A. J. BISSONETTE 2,756,332

TONE GENERATOR SYSTEM

Filed Jan. 7, 1954 2 Sheets-Sheet 1

Inventor
Alfred J. Bissonette
By Alois W. Graf
Attorney

Inventor
Alfred J. Bissonette
By Alois W. Graf
Attorney

United States Patent Office 2,756,332

Patented July 24, 1956

2,756,332

TONE GENERATOR SYSTEM

Alfred J. Bissonette, Milford, Ohio, assignor to The Baldwin Piano Company, Cincinnati, Ohio, a corporation of Ohio Application January 7, 1954, Serial No. 402,646

6 Claims. (Cl. 250—36)

The present invention relates to generator systems in which a master oscillator initiates the operation in a series of blocking oscillators sub-harmonically related in frequency to the frequency of the master oscillator.

It has heretofore been proposed to provide a generator system wherein a master oscillator controls the operation of a second generator operating at one-half of the frequency of the oscillator, which in turn controls the operation of a third generator operating at one-half of the frequency of the second generator and so on until an adequate number of harmonically related frequencies have been produced. This has been accomplished by using blocking generators or oscillators, and has found convenient application in electrical musical instruments.

In the generating systems heretofore employed it has been common to use a capacitor voltage divider in order to obtain a signal from each blocking oscillator. It would be desirable to obviate the use of such capacitor voltage dividers because of the large number used and the size of certain of them. Any attempt to obviate the use of such capacitors, however, encounters the problem of eliminating a large blocking capacitor to remove any direct current components from the output circuit. Direct current components in an output circuit in an electrical musical instrument would produce noise in the keying circuits, as in the case of an electronic organ. Such noise obviously cannot be tolerated, and hence in accordance with the present invention a new type of output circuit and generating system is provided whereby any direct current component which otherwise might appear in the output circuit is suppressed by a novel biasing arrangement.

It is, therefore, an object of the present invention to provide a more economical tone generator system for electronic musical instruments.

Still another object to be mentioned is to eliminate bulky and expensive capacitors in the output circuits of tone generators.

A still further object of the invention is to eliminate direct current components in the tone generator output circuit, and to prevent noise in the keying circuits of an electronic organ.

Other and further objects of the invention subsequently will become apparent by reference to the following description taken in conjunction with the accompanying drawings, wherein.

Figure 1:
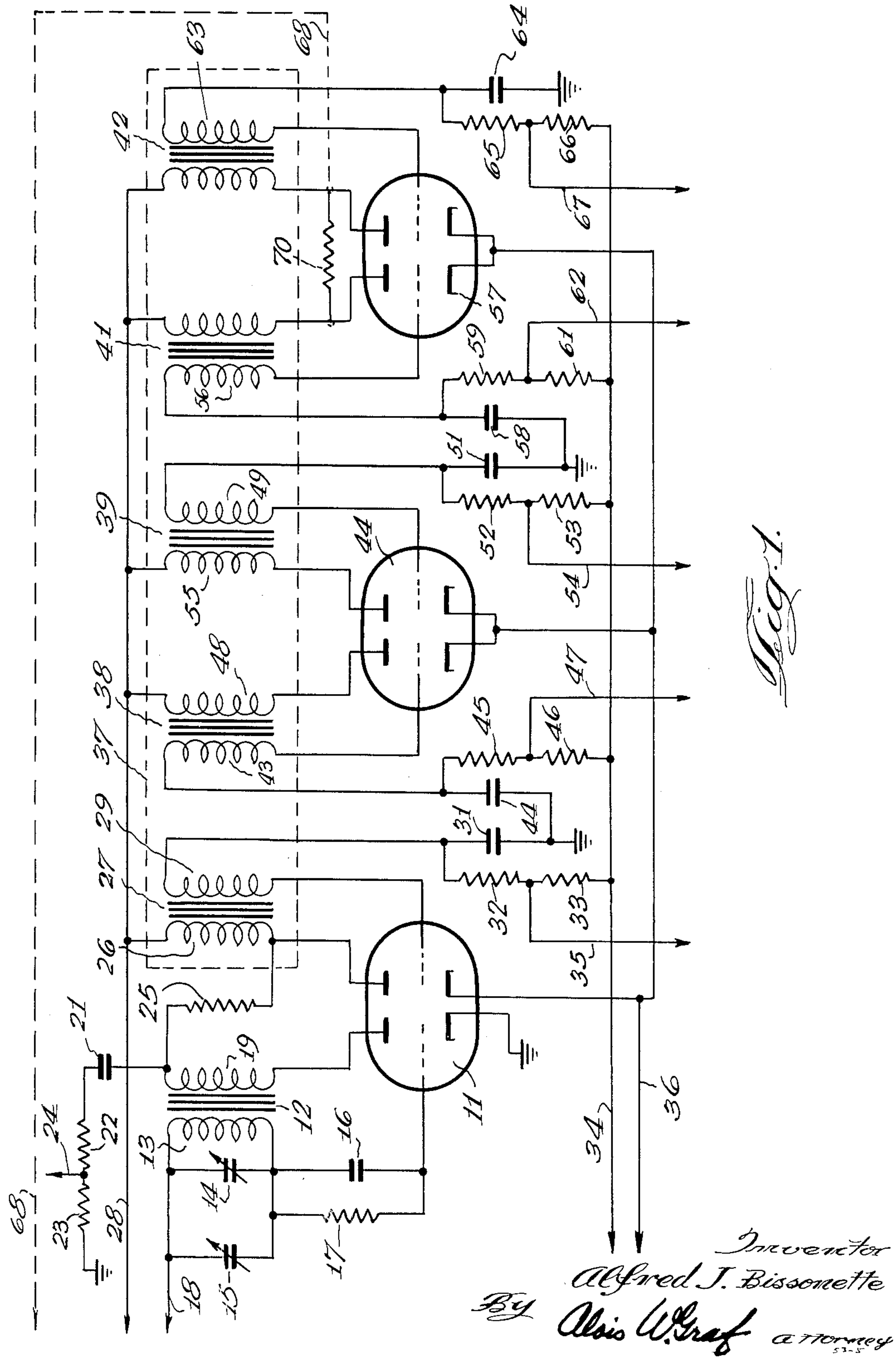
Figure 1 is a circuit diagram of an explanatory generator system employing the present invention.

In Figure 1 there is shown a master oscillator employing one-half of a double triode vacuum tube 11. A transformer 12 has a primary winding 13 connected to a fixed capacitor 14 and an adjustable capacitor 15 to provide a suitable resonant circuit. This resonant circuit is coupled through a capacitor 16 to the grid of the first triode portion of the vacuum tube 11, and is connected in parallel to a grid resistor 17. From the upper terminal of the primary winding 13 there is provided a connection 18 whereby a vibrato effect may be introduced, as will subsequently become apparent from a description of Figure 2.

The secondary winding of the transformer 12 is connected to the anode of the first triode portion of the vacuum tube 11, and is coupled through a capacitor 21 to a voltage divider circuit including two resistors 22 and 23 connected to ground, the common juncture between the resistors being connected to a conductor 24 from which a fundamental output may be obtained. Anode potential for the first triode section of vacuum tube 11 is obtained through a resistor 25 and the primary winding 26 of a transformer 27 which is connected to a high potential conductor 28. The cathode of the first triode section of the vacuum tube 11 is connected to ground.

The second triode section of the vacuum tube 11 is in a blocking oscillator circuit and has its anode connected to the juncture between the resistor 25 and the primary winding 26 of the transformer 27. The secondary winding 29 of the transformer 27 has one terminal connected to the grid of the second triode portion of the vacuum tube 11. The other end of the secondary winding 29 is connected to a capacitor 31 having one terminal connected to ground and is connected to two resistors 32 and 33 preferably having a 25 to 1 ratio between their resistance values. The higher value resistor 32 is connected adjacent the grid end of the circuit, and the lower value resistor 33 is connected to a conductor 34 which is connected to the positive terminal of a constant potential source having its negative terminal connected to ground. The common juncture between resistors 32 and 33 is connected to a conductor 35 completing one terminal of an output circuit, the other terminal of which is connected to ground.

The blocking oscillator which includes in its grid circuit the capacitor 31 and the resistor 32, has its operating frequency determined primarily by an adjustment of the resistors 32 and 33 after a proper value for the capacitor 31 has been selected. The cathode of the blocking oscillator portion of the vacuum tube 11 is connected to a conductor 36 which is connected to a positive terminal of a source of potential having its negative terminal connected to ground. This places an effective negative bias on the grid of the blocking oscillator so as to block operation thereof. The blocking oscillator will tend to go into operation because of the connection between the secondary winding 19 of the transformer 12 and the primary winding 26 of the transformer 27 through the resistor 25. It will be appreciated that any change in the anode current of the first triode section comprising the master oscillator will be reflected in the winding 26 of the second transformer 27 thereby changing the conditions heretofore existing so as to initiate oscillations in the first blocking oscillator. The change in current through the primary winding 26 of the transformer 27 changes the relation of the voltages existing with respect to the anode and grid of the blocking oscillator 11. This change is sufficient to permit a discharge or oscillation in spite of the bias supplied to the cathode from the conductor 36. The grid of the second triode portion of the vacuum tube 11, therefore, will have a relative potential which permits occurrence of an alternate oscillation in accordance with potential received from the master oscillator including the first triode portion of the vacuum tube 11. The frequency of oscillations produced by the first blocking oscillator will be half the frequency of the oscillations produced by the master oscillator.

The transformer 27 is wound on a magnetic core indicated by the dotted line rectangle 37 which is common to four additional transformers 38, 39, 41 and 42. The use of a common transformer iron 37 for the various transformers 27, 38, 39, 41, and 42 provides the desired degree of inductive coupling between the various stages of blocking oscillators to insure greater stability of operation as compared with certain other types wherein the energy transfers are effected by other circuit means such as capacities or resistances. The several transformers may be made up as windings on single leg cores, and may be so mounted on a panel or the like so that the transformers are located close to each other in a series in which the core legs are parallel. While this may have the same result as that which is obtained by the common magnetic structure 37, it is preferable to provide the closed magnetic circuit about all windings, each set of primary and secondary windings being assembled on its own core leg forming a part of the general assembly 37. The magnetic leg between the two transformers 27 and 38 is provided as the effective magnetic by-pass, and at the same time as a means of controlling the degree of magnetic coupling with great accuracy. A transformer of this type is illustrated and claimed in the United States Patent No. 2,555,038 granted upon the application of Edward M. Jones May 28, 1951 and assigned to the same assignee as the present application.

The second transformer 38 has a primary winding 43 connected to the grid of one-half of a double triode vacuum tube 44. One end of the transformer winding 43 is connected to a capacitor 44 which is grounded, and is also connected to two series resistors 45 and 46 having one terminal connected to the conductor 34. The common juncture between the resistors 45 and 46 is connected to a conductor 47 which serves as one terminal of an output circuit, the other terminal being connected to ground. The secondary winding 48 of the transformer 38 is connected to the conductor 28 which supplies the proper anode potential. Both cathodes of the two triode portions of the vacuum tube 44 are connected to the bias conductor 36. The primary winding 49 of the transformer 39 is connected to the grid of the second triode portion of the vacuum tube 44. One terminal of the primary winding 49 of the transformer 39 is connected to a grounded capacitor 51 and to two series resistors 52 and 53 which are connected to the conductor 54. The common juncture between the resistors is connected to a conductor 54 serving as one terminal of an output circuit, the other terminal of which is grounded. The secondary winding 55 of the transformer 39 is connected to the anode potential conductor 28. The primary winding 56 of the transformer 41 is connected to the grid of the first triode portion of a dual triode vacuum tube 57. The other terminal of the primary winding 56 is connected to a grounded capacitor 58 and to two series resistors 59 and 61, which in turn are connected to the conductor 54. The common juncture between these two resistors 59 and 61 is connected to another conductor 62 which serves as one terminal of an output circuit, the other terminal of which is grounded. Both cathodes of the triode portions of the vacuum tube 57 are connected to the bias potential conductor 36. The primary winding 63 of the transformer 42 is connected to the grid of the second triode portion of the vacuum tube 57 and to a grounded capacitor 64. The juncture between the capacitor 64 and the secondary winding 63 is connected to the conductor 54. The common juncture between the resistors 65 and 66 is connected to a conductor 67 serving as one terminal of the output circuit, the other terminal of which is grounded.

Figures 2, 3:
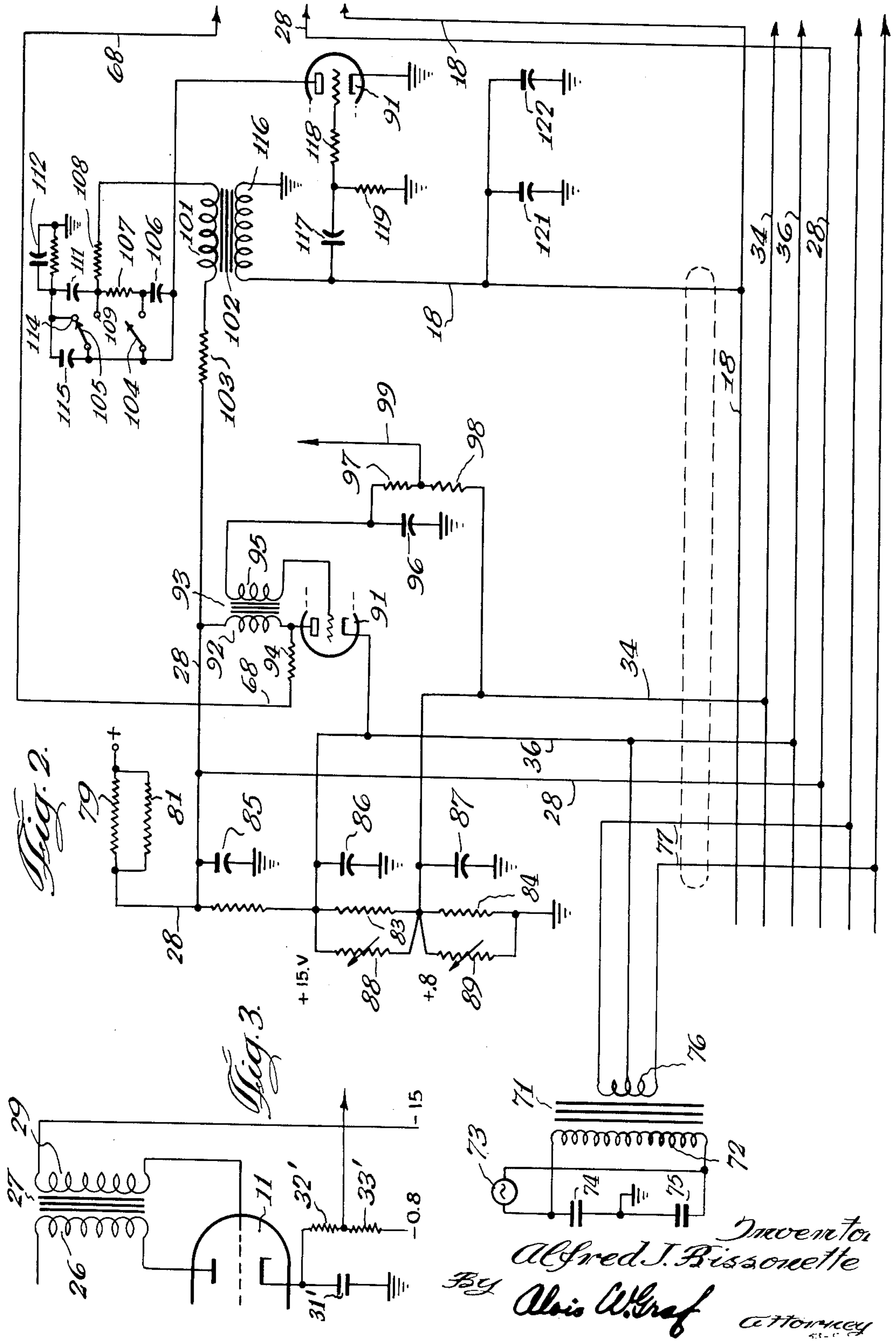
Figure 2 is a circuit diagram of the power supply and vibrato portion connected to the system shown in Figure 1.
Figure 3 is a partial circuit diagram of another variation.

In the case of a generating system such as shown in Figure 1 for the note C, the C subchassis includes an additional connection to the last anode of the tube 57 shown by a dotted line conductor 68. A resistor 70 is connected between the two anodes of the triode portions of the vacuum tube 57 to compensate for the loss in synchronizing signal caused by electrical coupling between the lowest subchassis oscillator and the extra C oscillator provided on the power supply chassis, the circuit of which is shown in Figure 2.

It, of course, will be understood that the blocking oscillator, such as that comprising the second triode portion of the vacuum tube 11, has its operating frequency determined by the values of the capacitor 31 and the resistors 32 and 33. It has previously been stated that it is intended that the resistors 32 and 33 be adjusted so as to determine this frequency. In making this adjustment the resistor 33 is connected to a source of potential having one terminal connected to ground. The value of the resistor 33 is selected to an approximately correct value known from previous experience. Then the value of resistor 32 is adjusted for optimum stability of the blocking oscillator circuit. The voltage of the conductor 34 is held at an exact positive potential value. A voltmeter is connected between the conductor 35 and ground for final adjustment of the resistors 32 and 33 so that no direct potential is indicated thereby. Thus in successive steps the resistors 45, 46, 52, 53, 59, 61, 65 and 66 are adjusted in accordance with the procedure just described.

When the adjustment has been completed the connections are returned to those shown in the circuit diagram, and potential is applied to the conductor 34 in opposite polarity to that previously appearing across the resistors 33, 46, 53, 61 and 66. This then balances out any direct current components which otherwise might appear in the output circuit due to the charging and discharging of the capacitors 31, 44, 51, 58 and 64. This eliminates the necessity of introducing a relatively large blocking capacitor into the output circuit, which is large, bulky and costly. In the adjustments made in the successive blocking oscillator stages, each stage is adjusted to operate at a frequency one-half of the operation of the previous stage. It, of course, will be appreciated that such change in frequency requires different values of adjustment in the resistors and capacitors in the latter stages of the blocking oscillators so that the capacitors become progressively larger and discharge resistances will be within a comparable range of values.

Detailed operation of the blocking oscillators is not believed necessary, although a brief description will be given. The cathodes of the blocking oscillators are all connected to the positive terminal of 15 volt source of potential provided by the conductor 36 so that the grids of the blocking oscillators in the absence of grid current are biased 15 volts negative with respect to their cathodes. Thus oscillation is prevented until a signal is supplied. When, for example, the first blocking oscillator receives a signal by virtue of the particular anode connection, the grid draws sufficient current that the voltage across the resistors 32 and 33 biases the triode section beyond cut-off and the high frequency oscillation stops. The charge on the capacitor 31 discharges relatively slowly through the resistors 32 and 33 until the bias becomes less than the cut-off value. The capacitor does not discharge sufficiently until two cycles of the master oscillator have been generated. Then another oscillation from the master oscillator causes this operation cycle to repeat. In the succeeding blocking oscillator stages the frequency determining circuit is so designed as to divide the frequency of the initiating oscillation by two.

Reference may now be had to Figure 2 which shows the power supply, the vibrato control and another fundamental oscillator. A transformer 71 having a primary winding 72 is connected to a source of alternating current 73. Preferably a line filter to shunt out line noise to ground is provided by two capacitors 74 and 75 connected in series across the primary winding 72 and having their common juncture connected to ground. A secondary winding 76 supplies filament voltage to a pair of conductors 77 which lead to the chassis shown in Figure 1 and also supply filament voltage to the vacuum tube shown in Figure 2. From another power unit not shown in Figure 2 there is supplied a high potential conductor 78 which is connected to two parallel resistors 79 and 81, which in turn are connected to the anode potential conductor 28 which also leads to the circuit shown in Figure 1. The conductor 28 is connected to a voltage divider including three series resistors 82, 83 and 84 connected to ground. The upper terminal of the resistor is by-passed to ground by a capacitor 85. The juncture between the resistors 82 and 83 is also by-passed to ground by a capacitor 86, and this juncture is connected to the conductor 36 which provides the 15 volts with respect to ground potential to be applied to the cathodes of the blocking oscillators of Figure 1. The common juncture between the resistors 83 and 84 is also by-passed to ground by a capacitor 87 which is connected to the conductor 34. The capacitor 87 is a relatively large capacitor connecting the common return point of all the signal resistors 33, 46, 53, 61 and 66 of Figure 1 to properly by-pass any audio voltage appearing across the resistor 84. The use of a single capacitor 87 eliminates the need for a blocking capacitor for each output circuit, which otherwise would be required if a capacitor divider network were to be used. In order to adjust accurately the voltages appearing across the resistors 83 and 84, these resistors are shunted by adjusting the resistors 88 and 89, respectively.

The circuit shown in Figure 2 includes a dual triode vacuum tube 91, the first triode portion of which has its cathode connected to the conductor 36. The anode of the vacuum tube 91 is connected through the secondary winding 92 of a transformer 93 to the potential conductor 28. In order to provide synchronization of the operation of the oscillator tube 91, the anode is connected through a resistor 94 to the conductor 68 which leads to the chassis having a circuit such as shown in Figure 1. The secondary winding 95 of the transformer 93 has one terminal connected to the grid of the first triode portion of the vacuum tube 91 and the other terminal connected to a network including a grounded capacitor 96 and two series resistors 97 and 98, which in turn are connected to the conductor 34. The common juncture between the resistors 97 and 98 is connected to a conductor 99 which is one terminal of an output circuit, the other terminal of which is grounded. It will readily be understood that in an electronic organ a set of generators such as shown in Figure 1 was provided for each of the notes in an octave, and that it is necessary to provide the final note C by means of the triode vacuum tube 91.

The other triode portion of the vacuum tube 91 has its cathode connected directly to ground and its anode connected to the vibrato control circuit connected to one terminal of a winding 101 to a transformer 102. The other terminal of the winding 101 is connected through a resistor 103 to the anode potential conductor 28. The vibrato control circuit includes two switches 104 and 105 connected to the anode of the second triode portion of the vacuum tube 91. The switch 104 when closed connects the anode to the common juncture between a capacitor 106 and a resistor 107, which in turn is connected through a resistor 108 to the winding 101 of the transformer 102. The common juncture between the resistors 107 and 108 is connected to one switch terminal 109 of the switch 105. This common juncture is also connected through a capacitor 111 to a parallel circuit comprising a capacitor 112 and a resistor 113 connected to ground. The juncture between the capacitors 111 and 112 is connected to the switch contact 114 of the switch 105. The switch contact 114 is connected to one terminal of a capacitor 115, the other terminal of which is connected to the switch arm of the switch 105 and to the anode of the second triode portion of the vacuum tube 91. The manipulation of the switches 104 and 105 provides two degrees of vibrato output.

The transformer 101 is provided with another winding 116 having one terminal grounded and the other terminal connected to the conductor 18 which leads to the master oscillator circuit shown in Figure 1. The conductor 18 and one terminal of the transformer winding 116 is connected through a coupling capacitor 117 to a resistor 118 which is connected to the grid of the second triode portion of the vacuum tube 91. The juncture between the capacitor 117 and the resistor 118 is connected to a resistor 119 having one terminal connected to ground. The conductor 18 is also connected to two grounded capacitors 121 and 122, the latter of which is adjustable in order to adjust the vibrato frequency to approximately seven cycles per second. The application of potential received from the vibrato oscillator through the conductor 18 will vary or shift the frequency of the master oscillator by nearly seven cycles per second. The magnitude of such variation is determined by manipulation of the switches 104 and 105.

While in Figure 2 the resistors 32 and 33 of the grid to cathode circuit have been shown connected adjacent the grid electrode, they could be connected adjacent the cathode electrode as illustrated in Figure 3. The larger resistor is always connected adjacent the vacuum tube electrode, and hence the resistor 32' is adjacent the cathode. The resistor 33' is connected to the conductor 34 or to the positive bias potential of approximately 0.8 volt. The lead to the grid through the transformer winding is connected to the conductor 36 or to the higher bias potential source. The capacitor 31' is connected between ground and the electrode adjacent the end of the larger resistor 32'.

While for the purpose of illustrating and describing the present invention certain specific embodiments have been shown in the drawings, it is to be understood that the invention is not to be limited thereby since such variations in the circuit components and in the system are contemplated as may be commensurate with the spirit and scope of the invention set forth in the accompanying claims.

I claim as my invention:

1. A generator system for producing a plurality of individual frequencies harmonically related comprising a master oscillator and a plurality of blocking oscillators coupled in seriatum whereby the first blocking oscillator produces oscillations in accordance with energy received from the master oscillator, each blocking oscillator comprising anode and grid circuits inductively coupled together, said circuits each being coupled to the succeeding oscillator anode and cathode circuits, each grid to cathode circuit including a resistor and a grounded capacitor for determining the frequency of operation, said resistor being connected in series with another resistor of lower value, said latter resistor being connected to a constant potential source connected to ground and of a value sufficient to balance out any direct current component in the output circuit, and an output circuit connected between ground and the common juncture between said grid to cathode circuit resistors.

2. A generator system comprising a master oscillator and five vacuum tube blocking oscillators arranged in seriatum and sub-harmonically related to said master oscillator, the first blocking oscillator being responsive to oscillations from said master oscillator and the remaining oscillators being responsive to the preceding blocking oscillator, each blocking oscillator having a grid to cathode circuit including two series resistors, a capacitor connected between ground and the grid end of said series resistors, an output circuit connected between ground and the common juncture between said resistors, a source of positive bias potential connected between ground and the other end of said series resistors, and a source of positive bias potential of greater magnitude than said first source of bias connected between ground and the cathode of said blocking oscillator.

3. A generator system comprising an oscillator and five blocking oscillators arranged in seriatum and sub-harmonically related to said first oscillator, the first blocking oscillator being responsive to oscillations from said first oscillator and the remaining oscillators being responsive to the preceding blocking oscillator, each blocking oscillator having a grid to cathode circuit including two series resistors, a capacitor connected between ground and the grid end of said series resistors, an output circuit connected between ground and the common juncture between said resistors, a source of positive bias potential connected between ground and the other end of said series resistors, said source of potential being common to all of said blocking oscillators and having a by-pass capacitor connected thereacross, and a source of positive bias potential of greater magnitude than said first source of potential connected between ground and the cathode of each blocking oscillator.

4. A generator system comprising a master oscillator and a plurality of blocking oscillators sub-harmonically related to said master oscillator, said master oscillator initiating oscillations in one of said blocking oscillators and the remaining oscillators being responsive to the preceding blocking oscillator, each blocking oscillator having a grid to cathode circuit including two series resistors having a resistance ratio of approximately 25 to 1, the larger resistor being located adjacent the grid, a capacitor connected between ground and the grid end of said larger resistor, an output circuit connected between ground and the juncture between said resistors, a source of positive bias potential connected between ground and the other end of said series resistors, said source of potential being relatively low but sufficient to eliminate direct current components from said output circuit, and a source of positive bias potential of greater magnitude than said first source of potential connected between ground and the cathode of said blocking oscillator.

5. A generating system comprising a source of oscillations, a series of blocking oscillators arranged to become successively operable at sub-harmonic frequencies in accordance with said source of oscillations, each oscillator having a grid to cathode circuit including two series resistors having values in the ratio of approximately 25 to 1, the larger resistor being connected adjacent the grid, a capacitor connected between ground and the end of the larger resistor adjacent the grid, an output circuit connected between ground and the common juncture between said resistors, a source of biasing potential connected to ground and in series with said resistors, and means for inductively coupling together the circuits of said series of blocking oscillators.

6. In a generator system for producing a plurality of harmonically related individual frequencies having a plurality of oscillators coupled in seriatum, each oscillator having a circuit including two series resistors and a source of bias potential, an output circuit connected between ground and the common juncture between said resistors, and a source of bias potential connected between ground and the bias terminal of said series resistors having a potential opposite in polarity to the direct current voltage drop across the latter resistor.

References Cited in the file of this patent

UNITED STATES PATENTS

| | | |
|---|---|---|
| 2,555,038 | Jones | May 29, 1951 |
| 2,555,039 | Bissonette | May 29, 1951 |
| 2,555,040 | Jordon | May 29, 1951 |